United States Patent Office 3,751,461
Patented Aug. 7, 1973

3,751,461
ALPHA CHLORINATION OF ACID CHLORIDES
Yog R. Dhingra, Midland, Mich., assignor to The Dow Chemical Company, Midland, Mich.
No Drawing. Continuation-in-part of applications Ser. No. 86,338, Nov. 2, 1970, and Ser. No. 126,355, Mar. 19, 1971. This application Nov. 29, 1971, Ser. No. 203,043
Int. Cl. C07c 51/58, 53/20, 55/02
U.S. Cl. 260—544 Y          7 Claims

ABSTRACT OF THE DISCLOSURE

Acid chlorides are chlorinated in the alpha position by reacting the acid chloride with chlorine in the presence of a catalyst of an alkylpyridine or tetraalkylammonium halide.

CROSS-REFERENCE TO RELATED APPLICATION

This application is a continuation-in-part of my copending applications Ser. No. 86,338, filed Nov. 2, 1970 and Ser. No. 126,355, filed Mar. 19, 1971 which have now been abandoned.

BACKGROUND OF THE INVENTION

Porai-Koshits et al. in J. Gen. Chem. U.S.S.R., 26, 451 (1956) shows the chlorination of chloroacetyl chloride in the presence of pyridine. A specific reaction on page 454 of this reference shows that the chlorination gives a rapid reaction with a predominant yield of trichloroacetyl chloride.

Most commercial operations prepare α-chloroalkanoyl chlorides by the acid catalyzed chlorination of an alkanoyl chloride. Such chlorinations require long reaction times and high temperatures.

SUMMARY OF THE INVENTION

It has now been found according to the present invention that the use of alkylpyridines having 1 to 3 alkyl groups of 1 to 6 carbons each, provided that there are no alkyl groups in both the 2 and 4 position, or a tetraalkylammonium halide wherein the alkyl or phenylalkyl groups have 1 to about 8 carbon atoms catalyst that is at least partially soluble in the reaction mixture, in the known chlorination of an acid chloride with chlorine, gives a rapid reaction with high yields of α-perchloroacyl chloride. The alkylpyridine and tetraalkylammonium halide catalysts are unexpectedly superior to the known pyridine catalyst because they significantly increase the rate of the reaction.

The alkylpyridine catalysts of the invention are effective when added as either the free alkylpyridine, or when added as a salt, preferably the hydrochloride salt. The alkylpyridine catalysts are any compound having the formula

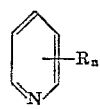

where each R is independently an alkyl of 1 to about 6 carbon atoms and $n$ is an integer of 1 to 3, provided that there are no alkyl groups in both the 2 and 4 position.

Of special significance because of the short reaction times and high yields are the methylpyridines, with the use of 3,5-dimethylpyridine being of greatest importance because of the rapid reaction.

The tetraalkylammonium halide catalysts of the invention are any compound of the formula

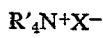

wherein each R' is independently an alkyl or phenylalkyl of 1 to 8 carbon atoms and X is a halide ion selected from the group consisting of F, Cl, Br or I.

In the use of this catalyst, the halide salt, or another salt or base which is converted in the reaction mixture to the halide, is added to the reaction mixture. Of all the catalysts of the present invention, the tetraalkylammonium halides are preferred because of the highly desirable rate of reaction obtained.

An important attribute of the catalysts of the invention is their solubility. The catalysts of the invention must be at least partially soluble in the reaction mixture because the intimate contact derived from a solution is necessary for effective catalysis. Most of the catalysts of the invention have the requisite solubility in any of the reaction mixtures throughout the reaction, others are initially soluble but precipitate during the course of the reaction and still others are sparingly soluble even at the beginning of the reaction. As the chlorination proceeds, the salts of the invention either added to the reaction or formed in the reaction tend to be less soluble in the reaction mixture. To counteract this effect, a catalyst of a suitable solubility is employed, or other techniques for increasing the solubility, such as the use of surfactants or solvents, are employed. Of the catalysts of the invention, those of special interest are soluble throughout the chlorination to the desired degree of conversion.

The acid chlorides chlorinated by the process of the present invention are any of those having the formula

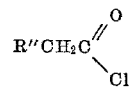

wherein R" is H, an alkyl of 1 to about 10 carbons or

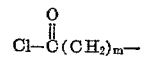

where $m$ is an integer of 0 to 10. Representative examples of such acid chlorides include: alkanoyl chlorides, such as acetyl chloride, propionyl chloride, butyryl chloride, caproyl chloride, capryl chloride and lauryl chloride; and diacid chlorides, such as malonyl chloride, succinyl chloride, glutaryl chloride, adipyl chloride, sebacyl chloride and dodecanedioyl chloride. In addition to these hydrocarbon acid chlorides, substituted acid chlorides having at least one H in the α position may be chlorinated in the present invention, especially those that already have one halogen in the alpha position, such as chloroacetyl chloride. Preferred acid chlorides chlorinated in the invention are alkanoyl chlorides of where R" is an alkyl of 1–3 carbons, with acetyl chloride, chloroacetyl chloride and propionyl chloride being of special interest.

All of the acid chlorides of the present invention are chlorinated to replace hydrogens in the α position with chlorine. Of course, in the chlorination of acid chlorides having labile hydrogens in other than the α position, there is a competing chlorination, but the process of the invention can give a product having a high percentage of α chlorination.

The conditions for the chlorination of the invention are known and may vary widely. Generally, a small but effective amount, about 1 to about 10 weight percent, of the catalyst is added to liquid acid chloride and chlorine gas is bubbled through the mixture until the desired degree of chlorination is attained. During the reaction, the temperature is adjusted to maintain the acid chloride in the liquid phase. As the chlorination proceeds, the minimum temperature required is, of course, increased or a solvent is necessary. Preferably, the reaction is conducted at a temperature between about 45° and about 150° C. or more for the lower alkanoyl chlorides, with temperatures between about 80° and 120° C. being especially preferred.

SPECIFIC EMBODIMENTS

To get a valid comparison of the process of the instant invention using the disclosed catalysts and the pyridine catalyst shown by Porai-Koshits, the half-life or $t^{1/2}$ method was employed. This is one of the more common methods of comparing reaction rates. The term "half-life" is defined as the time necessary to react one-half of the initial concentration of a reactant. In the case of base catalyzed chlorination of chloroacetyl chloride, the half-life, $t^{1/2}$ was determined by the following stepwise procedure:

(1) The initial concentration of the chloroacetyl chloride was measured at time 0 (moles/liter).

(2) The unreacted chloroacetyl chloride concentration was then measured at various time intervals during the course of reaction.

(3) The log of the chloroacetyl chloride concentration (moles/liter) vs. time (minutes) was plotted. A linear plot was obtained as the chlorinations all involved first order reactions.

(4) The half-life was then determined from the linear plot as time (minutes) against one-half of the initial concentration.

Examples 1–6 and Comparative Example A—Chlorination of chloroacetyl chloride In parallel experiments, about 100 g. of chloroacetyl chloride was placed in a reactor along with 2.6 mole percent of the catalyst based on the chloroacetyl chloride charge. The reactor and contents were heated to a temperature of 85° C. and chlorine was sparged through the reaction mixture at a rate which allowed a small amount of chlorine to escape the reactor, thus assuring an excess of chlorine in the reaction mixture at all times. In each example, samples were withdrawn periodically and analyzed for their chloroacetyl chloride, dichloroacetyl chloride and trichloroacetyl chloride content and the weight percent of each calculated. In each case, the log of the concentration of chloroacetyl chloride was plotted and the half-life determined from the linear plot. The results are given in Table I.

TABLE I

| Example | Catalyst | Mole percent of catalyst based on (CAC¹) | Time (min.) at ½ CAC¹ conc. |
|---|---|---|---|
| Comp. A | Pyridine | 2.60 | 170 |
| 1 | 2,4-dimethylpyridine | 2.608 | 161 |
| 2 | 4-methylpyridine | 2.611 | 155 |
| 3 | 2-methylpyridine | 2.62 | 155 |
| 4 | 3-methylpyridine | 2.60 | 134 |
| 5 | 3,5-dimethylpyridine | 2.606 | 129 |
| 6 | Tetrapropylammonium chloride | 2.602 | 103 |

¹ Chloroacetyl chloride.

Example 7—Chlorination of chloroacetyl chloride in the presence of 2-pentylpyridine In a manner similar to the reaction of Examples 1–6, 2-pentylpyridine was used in the chlorination of chloroacetyl chloride except that 3.5 mole percent of the 2-pentylpyridine based on the chloroacetyl chloride charge were used and the reactor heated to about 95° C. In less than five hours, over 98% of the chloroacetyl chloride was converted.

Examples 8–10—Chlorination of chloroacetyl chloride in the presence of tetraalkylammonium halides In a manner similar to Example 7 above, tetramethylammonium chloride, tetra-n-butylammonium bromide and tetra-n-heptylammonium chloride were each used in the chlorination of chloroacetyl chloride. Consumption of chlorine was about 100 cc./min. Since these tests were run to determine the operable range of the tetraalkylammonium halides, the products were not isolated.

Examples 11–12 with comparative examples—Chlorination of α-chloropropionyl chloride In a black 500 ml. flask equipped with a condenser, mechanical stirrer, chlorine sparger and a temperature control, 140 g. of α-chloropropionyl chloride and 4.6 g. (0.043 mole) of 3,5-dimethylpyridine were added and the contents were heated to about 100° C. Chlorine was sparged into the reaction mixture at a rate of about 50–60 cc./min. which allowed a small excess of chlorine in the reaction. After 24 hours, the chloropropionyl chloride was 99% converted to give a 99% yield of α,α-dichloropropionyl chloride. A reaction run with a pyridine catalyst under these conditions for 24 hours gave a 87% conversion to products that were 97% α,α-dichloropropionyl chloride. Similarly, a reaction run using 5 mole percent of 3,5-dimethylpyridine based on the α-chloropropionyl chloride charge except at a temperature of 110° C. gave a 100% conversion in 15 hours. A reaction run with a pyridine catalyst under these conditions for 24 hours gave only 95% conversion. A chlorination utilizing 2.5 mole percent pyridine, after 24 hours, gave 98% conversion. In a reaction catalyzed with $H_2SO_4$ run at 110° C. for 50 hours, a conversion of 40% and yield of 100% were obtained.

Example 13—Chlorination of glutaryl chloride

To the reactor of Example 13, 51.5 g. (0.3 mole) of glutaryl chloride and 1.42 g. (0.015 mole) of 4-picoline were added and the contents were heated to about 105° C. Chlorine was sparged into the reaction mixture as above. After five hours, the product was identified by nuclear magnetic resonance spectroscopy to be 90% 2,2,4,4-tetrachloroglutaryl chloride and 10% 2,2-dichloroglutaryl chloride.

In the same manner as shown by Example 11, α,α-dichlorobutyryl chloride was prepared from butyryl chloride.

In the same manner as shown by Example 13, 2,2,3,3-tetrachlorosuccinyl chloride was prepared from succinyl chloride and 2,2,5,5-tetrachloroadipyl chloride was prepared from adipyl chloride.

Also in the same manner as shown for chloroacetyl chloride, acetyl chloride, propionyl chloride, hexanoyl chloride, sebacyl chloride and pimelyl chloride are chlorinated in the presence of a tetraalkylammonium halide, such as tetraethylammonium fluoride, diethyldibutylammonium iodide, tetrapentylammonium bromide, tetradodecylammonium chloride or triethylbenzylammonium chloride to give an α-chlorinated product.

I claim:

1. In the process for chlorinating an acid chloride of the formula

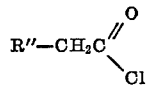

wherein R″=H, an alkyl of 1–5 carbons or

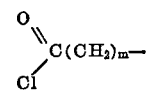

where $m$ is an integer of 0–10, or a substituted acid chloride having at least one alpha H by contacting the acid chloride with chlorine in the presence of a catalyst, the improvement comprising using as the catalyst an alkylpyridine selected from the group consisting of 3-alkylpyridine and 3,5-alkylpyridine wherein the alkyls have 1 to 6 carbon atoms each, a tetraalkylammonium halide wherein the alkyl or phenylalkyl groups have 1 to about 8 carbon atoms, or mixture thereof, such catalyst being at least partially soluble in the reaction mixture.

2. The process of claim 1 wherein the catalyst is the alkylpyridine and each alkyl group is methyl.

3. The process of claim 2 wherein the catalyst is 3,5-dimethylpyridine.

4. The process of claim 1 wherein the catalyst is the tetraalkylammonium halide and is the chloride of bromide.

5. The process of claim 1 wherein R'' of the acid chloride is an alkyl of 1–3 carbons.

6. The process of claim 1 wherein the acid chloride is acetyl chloride or chloroacetyl chloride.

7. The process of claim 1 wherein the acid chloride is propionyl chloride or α-chloropropionyl chloride.

References Cited
FOREIGN PATENTS 1,159,266  7/1969  Great Britain.

OTHER REFERENCES

Porai-Koshits et al.: J. Gen. Chem. U.S.S.R., 26, pp. 451–4 (1956).

LORRAINE A. WEINBERGER, Primary Examiner

R. D. KELLY, Assistant Examiner

U.S. Cl. X.R.

260—408

PO-1050
(5/69)

UNITED STATES PATENT OFFICE
CERTIFICATE OF CORRECTION

Patent No. 3,751,461   Dated August 7, 1973

Inventor(s) Yog R. Dhingra

It is certified that error appears in the above-identified patent and that said Letters Patent are hereby corrected as shown below:

Claim 4, appearing in Column 5, line 6, delete "of" and substitute therefor --or--.

Signed and sealed this 19th day of March 1974.

(SEAL)
Attest:

EDWARD M. FLETCHER, JR.          C. MARSHALL DANN
Attesting Officer                Commissioner of Patents